US012691702B2

(12) United States Patent
Cape et al.

(10) Patent No.: US 12,691,702 B2
(45) Date of Patent: Jul. 28, 2026

(54) MICRO-OPTIC SECURITY DEVICE WITH MULTI-PHASE ICON STRUCTURE

(71) Applicant: Crane & Co., Inc., Dalton, MA (US)

(72) Inventors: Samuel M. Cape, Woodstock, GA (US); Benjamin E. Bleiman, Cumming, GA (US); Jason Van Gumster, Woodstock, GA (US)

(73) Assignee: Crane & Co., Inc, Dalton, MA (US)

( * ) Notice: Subject to any disclaimer, the term of this patent is extended or adjusted under 35 U.S.C. 154(b) by 238 days.

(21) Appl. No.: 18/549,567

(22) PCT Filed: Mar. 8, 2022

(86) PCT No.: PCT/US2022/071033
§ 371 (c)(1),
(2) Date: Sep. 7, 2023

(87) PCT Pub. No.: WO2022/192874
PCT Pub. Date: Sep. 15, 2022

(65) Prior Publication Data
US 2024/0174019 A1      May 30, 2024

Related U.S. Application Data

(60) Provisional application No. 63/158,276, filed on Mar. 8, 2021.

(51) Int. Cl.
B42D 25/351      (2014.01)
B42D 25/24      (2014.01)
(Continued)

(52) U.S. Cl.
CPC ......... B42D 25/351 (2014.10); B42D 25/324 (2014.10); B42D 25/342 (2014.10);
(Continued)

(58) Field of Classification Search
CPC .. B42D 25/351; B42D 25/324; B42D 25/342; B42D 25/328; B42D 25/24; B42D 25/29; B42D 25/36; G02B 3/005; G02B 3/0056
See application file for complete search history.

(56) References Cited

U.S. PATENT DOCUMENTS

| | | | |
|---|---|---|---|
| 8,739,711 B2 | 6/2014 | Cote | |
| 2005/0180020 A1* | 8/2005 | Steenblik | B42D 25/369 |
| | | | 359/626 |

(Continued)

FOREIGN PATENT DOCUMENTS

| | | |
|---|---|---|
| WO | 2004033229 A2 | 4/2004 |
| WO | 2005052650 A2 | 6/2005 |

OTHER PUBLICATIONS

International Search Report and Written Opinion of the International Searching Authority dated May 12, 2022, in connection with International Application No. PCT/US2022/071033, 10 pages.

(Continued)

*Primary Examiner* — Angela M. Medich

(57) ABSTRACT

An optical security device includes an array of focusing elements spaced at a first pitch along a first axis of repetition, wherein each focusing element of the array of focusing elements is associated with a focal footprint at a first focal depth. The optical security device further includes an icon layer disposed at the first focal depth relative to the array of focusing elements, the icon layer comprising an array of hybrid image icons. Each hybrid image icon includes a first component associated with a first emergent image projected by the optical security device and a second component associated with a second emergent image projected by the optical security device.

18 Claims, 7 Drawing Sheets

(51) Int. Cl.

| | |
|---|---|
| *B42D 25/29* | (2014.01) |
| *B42D 25/324* | (2014.01) |
| *B42D 25/342* | (2014.01) |
| *G02B 3/00* | (2006.01) |

(52) U.S. Cl.
CPC ........... *G02B 3/005* (2013.01); *G02B 3/0056* (2013.01); *B42D 25/24* (2014.10); *B42D 25/29* (2014.10)

(56) References Cited

U.S. PATENT DOCUMENTS

| | | |
|---|---|---|
| 2007/0058260 A1 | 3/2007 | Steenblik et al. |
| 2011/0036282 A1 | 2/2011 | Cote |
| 2013/0038942 A1 | 2/2013 | Holmes |
| 2013/0050819 A1 | 2/2013 | Holmes |
| 2016/0176221 A1 | 6/2016 | Holmes |
| 2018/0001692 A1 | 1/2018 | Rich et al. |
| 2021/0053381 A1 | 2/2021 | Cape et al. |

OTHER PUBLICATIONS

Communication pursuant to Rule 164(1) EPC and Partial Supplementary European Search Report dated Jan. 28, 2025, in connection with European Application No. 22768212.7, 16 pages.

Extended European Search Report dated Apr. 10, 2025, in connection with European Application No. 22768212.7, 19 pages.

Office Action dated Aug. 29, 2025, in connection with Russian Application No. 2023125607, 17 pages.

Notice of Reasons for Refusal dated Jan. 9, 2025, in connection with Japanese Application No. 2023-555331, 8 pages.

Office Action dated Feb. 5, 2026, in connection with Brazilian Application No. BR112023018101-1, 8 pages.

Office Action dated Apr. 4, 2026, in connection with Chinese Application No. 202280020237.9, 18 pages.

Decision of Refusal dated Apr. 28, 2026, in connection with Japanese Application No. 2023-555331, 7 pages.

Notice of First Substantive Requirement dated Apr. 23, 2026, in connection with Mexican Patent Application No. MX/a/2023/010456, 10 pages.

* cited by examiner

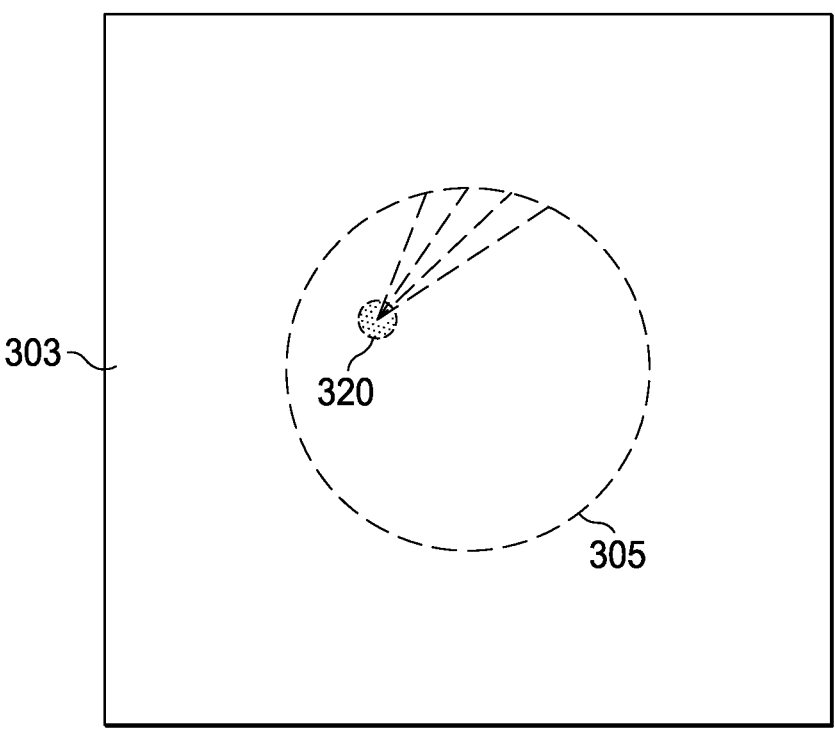
303
320
305
FIG. 3A
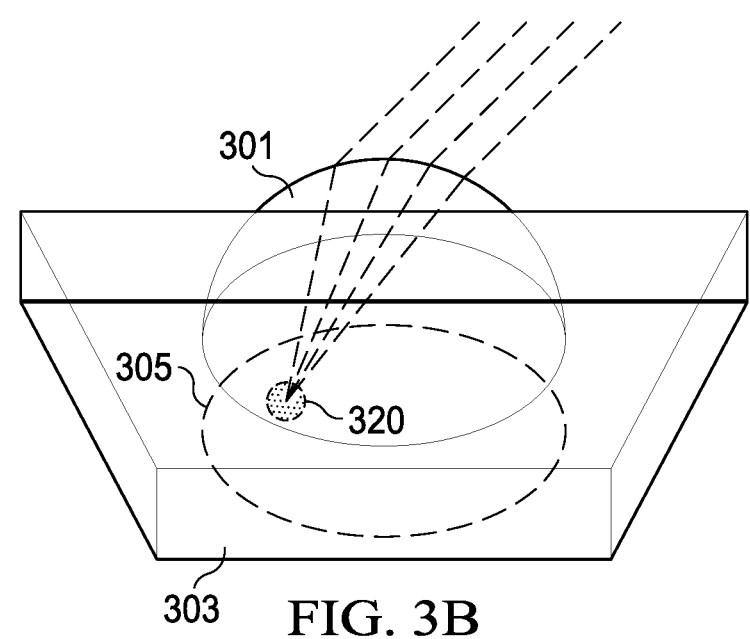
301
305
320
303 FIG. 3B

MICRO-OPTIC SECURITY DEVICE WITH MULTI-PHASE ICON STRUCTURE

CROSS-REFERENCE TO RELATED APPLICATIONS

This application is a 371 National Stage of International Application No. PCT/US2022/071033, filed Mar. 8, 2022, which claims priority to U.S. Provisional Patent Application No. 63/158,276, filed Mar. 8, 2021, the disclosures of which are incorporated herein by reference.

TECHNICAL FIELD

This disclosure relates generally to anti-counterfeiting of secure or high value documents, such as banknotes, passports, and tickets. More specifically, this disclosure relates to a micro-optic security device with a multi-phase icon structure.

BACKGROUND

Micro-optic security devices or devices comprising an array of micro-scale focusing elements and arrangements of image icons (for example, sub-micro-scale regions of colored material) in the focal plane of the focusing elements, which work together to provide one or more characteristic visual effects (for example, an emergent or "synthetic" image having a three-dimensional appearance), have proven heretofore generally effective in providing trustworthy visual indicia of the authenticity of value documents, such as currency notes and passports.

The performance and effectiveness of micro-optic security devices as visual level (i.e., detectable with a human eye, rather than with a banknote equipment manufacturer ("BEM") device or other specialized machinery) indicia of the authenticity of a document, can depend, at least in part, on the extent to which the micro-optic security device provides a visual effect which visually engages users, and to which the appearance of the security device or visual effects provided by the security device is beyond the current capabilities of counterfeiters and malicious actors.

Micro-optic security devices which provide novel visual effects (i.e., visual effects which have not been previously seen before) can be especially effective in that their novelty not only increases the likelihood of user engagement (as users are more likely to notice a never-before-seen feature) and, at the same time, decreases the incidence of counterfeiting (as the manufacturing and design techniques used to produce the novel visual effect have not yet been mastered by counterfeiters).

Thus, expanding the range of visual effects provided by micro-optic security devices remains a source of technical challenges and opportunities for improvement in the art.

SUMMARY

This disclosure provides a micro-optic security device with a multi-phase icon structure.

In a first embodiment, an optical security device includes an array of focusing elements spaced at a first pitch along a first axis of repetition, wherein each focusing element of the array of focusing elements is associated with a focal footprint at a first focal depth. The optical security device further includes an icon layer disposed at the first focal depth relative to the array of focusing elements, the icon layer comprising an array of hybrid image icons. Each hybrid image icon includes a first component associated with a first emergent image projected by the optical security device and a second component associated with a second emergent image projected by the optical security device. The first components of the hybrid image icons repeat along the first axis of repetition such that the first components of the hybrid image icons occupy a first phase space within focal footprints of focusing elements of the array of focusing elements. The second components of the hybrid image icons repeat along the first axis of repetition such that the second components of the hybrid image icons occupy a second phase space within focal footprints of focusing elements of the array of focusing elements.

In a second embodiment, a method of making an optical security device includes providing an array of focusing elements spaced at a first pitch along a first axis of repetition, wherein each focusing element of the array of focusing elements is associated with a focal footprint at a first focal depth. The method further includes providing an icon layer disposed at the first focal depth relative to the array of focusing elements, the icon layer comprising an array of hybrid image icons. Each hybrid image icon includes a first component associated with a first emergent image projected by the optical security device and a second component associated with a second emergent image projected by the optical security device. The first components of the hybrid image icons repeat along the first axis of repetition such that the first components of the hybrid image icons occupy a first phase space within focal footprints of focusing elements of the array of focusing elements. The second components of the hybrid image icons repeat along the first axis of repetition such that the second components of the hybrid image icons occupy a second phase space within focal footprints of focusing elements of the array of focusing elements.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 3A through 3C illustrate aspects of a focal footprint of a focusing element according to various embodiments of this disclosure;

DETAILED DESCRIPTION

FIGS. 1 through 7, discussed below, and the various embodiments used to describe the principles of this disclosure in this patent document are by way of illustration only and should not be construed in any way to limit the scope of the disclosure.

Figure 1:
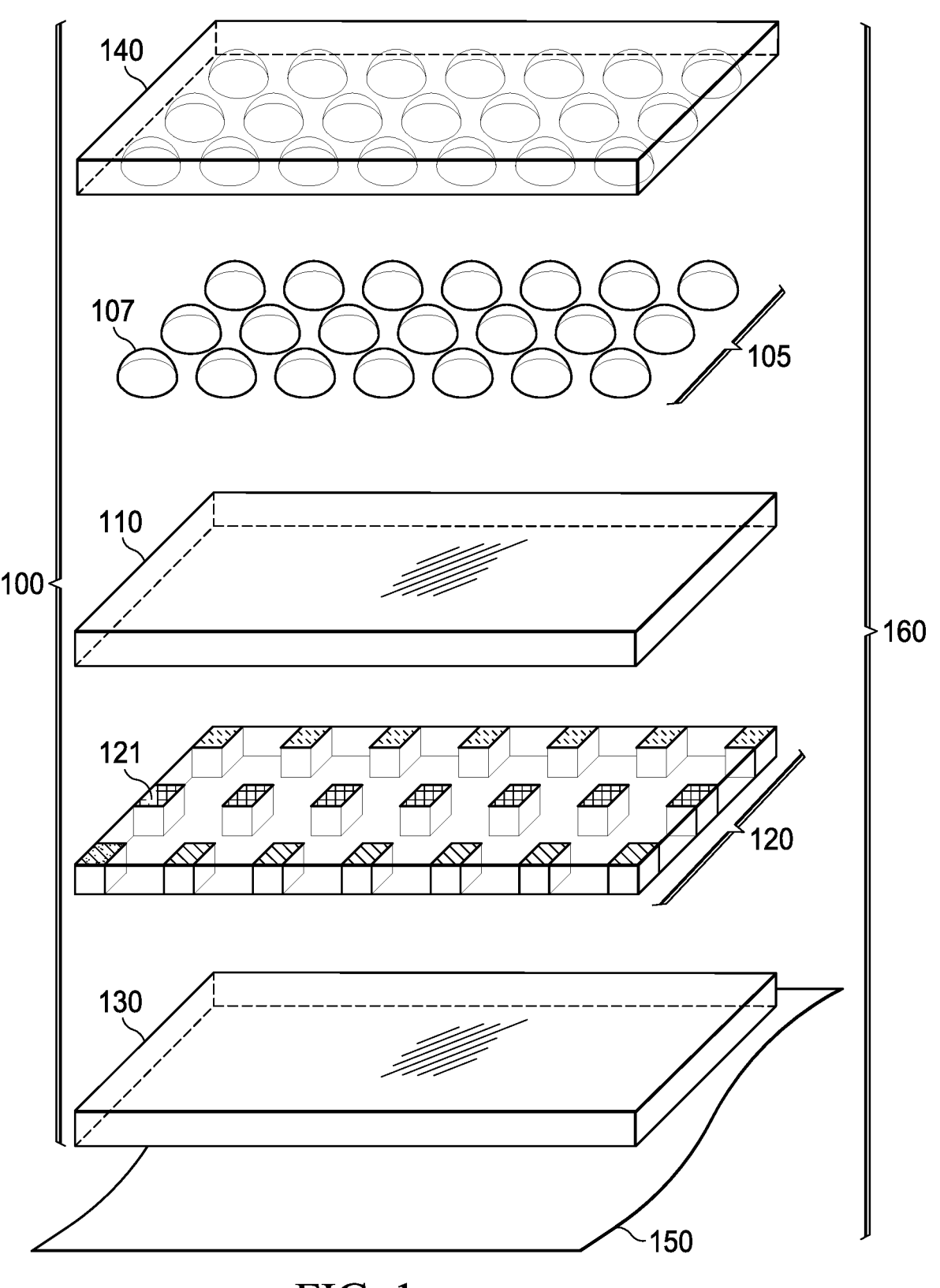
FIG. 1 illustrates an example of a micro-optic system according to certain embodiments of this disclosure.

FIG. 1 illustrates an example of a micro-optic system 100 according to certain embodiments of this disclosure.

Referring to the non-limiting example of FIG. 1, micro-optic system 100 comprises, at a fundamental level, a planar array of focusing elements 105 (including, for example, focusing element 107), and an arrangement of image icons 120 (including, for example, image icon 121). In the illustrative example of FIG. 1, the focusing elements of planar array of focusing elements 105 are spherical lenses. However, other species of focusing elements are possible and within the contemplated scope of this disclosure. Examples of focusing elements suitable for use in micro-optic systems according to this disclosure include, without limitation, aspherical lenses, Fresnel lenses, reflective lenses, lenticular lenses, and sealed lenticular lenses.

According to various embodiments, each focusing element of planar array of focusing elements 105 has a focal footprint, in which one or more image icons of arrangement of image icons 120 is positioned. In certain embodiments, the locations of the image icons within arrangement of image icons 120 within the respective focal footprint of each focusing element correspond to spaces between retaining structures in an image icon layer.

As used in this disclosure, the expression "focal footprint" encompasses an area within, or proximate to, the focal plane of a focusing element, over which the focusing element can focus light within one or more predefined criteria (for example, brightness and sharpness of focus). Depending on embodiments, the focal footprint of a focusing element may be co-extensive with the base of the focusing element. Alternatively, the focal footprint of a focusing element may differ in one or more of the shape and area of the base of the focusing element. As an illustrative example, a focusing element with a round base profile (for example a spherical lens or reflector) may have a hexagonal focal footprint.

According to some embodiments, the ratio of the resolution of planar array of focusing elements 105 (for example, the number of focusing elements provided in a specified area, such as a 1×1 mm box) relative to the resolution of the arrangement of image icons 120 (for example, the number of focusing elements provided in the specified area) is 1 or greater. As a non-limiting example, each image icon within arrangement of image icons 120 may fall within the focal footprints of multiple focusing elements. As a further non-limiting example, there may not be image icons within the focal footprint of every focusing element within the specified area. Additionally, in some embodiments according to this disclosure, the ratio of the resolution of planar array of focusing elements 105 relative to the resolution of the arrangement of image icons 120 may have a value of less than 1.

According to certain embodiments, a plurality of focusing elements comprises a planar array of focusing elements 105. In some embodiments, the focusing elements of planar array of focusing elements 105 comprise micro-optic refractive focusing elements (for example, plano-convex or GRIN lenses), with a lensing surface providing a curved interface between regions of dissimilar indices of refraction (for example, a polymer lens material and air). Refractive focusing elements of planar array of focusing elements 105 are, in some embodiments, produced from light cured resins with indices of refraction ranging from 1.35 to 1.7, and have diameters ranging from 5 μm to 200 μm. In various embodiments, the focusing elements of planar array of focusing elements 105 comprise reflective focusing elements (for example, very small concave mirrors), with diameters ranging from 5 μm to 200 μm. While in this illustrative example, the focusing elements of planar array of focusing elements 105 are shown as comprising circular plano-convex lenses, other refractive lens geometries, for example, lenticular lenses, are possible and within the contemplated scope of this disclosure.

According to various embodiments, the focusing elements of planar array of focusing elements 105 are disposed at regular intervals (sometimes referred to as a "pitch" or "lens pitch") along at least one axis of repetition. In the case of a lenticular array of focusing elements, the focusing elements are disposed along a single axis of repetition. However, in the case of spherical or other focusing element geometries, the focusing elements of planar array of focusing elements 105 can repeat across two axes of repetition. Further, depending on the configuration of the focusing elements, the axes of repetition can variously be orthogonal or non-orthogonal to each other.

As shown in the illustrative example of FIG. 1, arrangement of image icons 120 comprises a set of image icons (including image icon 121), positioned at predetermined locations within the focal footprints of the focusing elements of planar array of focusing elements 105. According to various embodiments, the individual image icons of arrangement of image icons 120 comprise regions of light cured material in the spaces defined by retaining structures in a structured image icon layer. As used in this disclosure, the term "structured image layer" encompasses a layer of material (for example, a light-curable resin) which has been embossed, or otherwise formed to comprise structures (for example, recesses, posts, grooves, or mesas) for positioning and retaining image icon material. According to certain embodiments, arrangement of image icons 120 is constructed to facilitate dynamic redesign and reconfiguration of the image icon structure of micro-optic system 100. For example, arrangement of image icons 120 is, in some embodiments, formed by selectively filling and curing retaining structures (as shown in FIG. 1, square wells) with uncured pigmented material of one or more colors which are then cured to create regions, or zones of color within arrangement of image icons 120. In this non-limiting example, the different colors within arrangement of image icons 120 are represented by different fill patterns on a surface of the image icons most proximate to the focusing layers. For example, image icon 121 is shown as having the same color as image icons in its row.

As discussed with reference to the illustrative examples of FIGS. 4-7 of this disclosure, in certain embodiments, the image icons of arrangement of image icons 120 can be hybrid image icons. As used in this disclosure, the expression "hybrid image icons" encompasses image icons which have been subdivided into two or more components, wherein each component can occupy a different phase along a shared axis of repetition between focusing elements and icon structures.

As shown in the illustrative example of FIG. 1, in certain embodiments, micro-optic system 100 includes an optical spacer 110. According to various embodiments, optical spacer 110 comprises a film of substantially transparent material which operates to position image icons of arrangement of image icons 120 in or around the focal plane of focusing elements of planar array of focusing elements 105. In certain embodiments according to this disclosure, optical spacer 110 comprises a manufacturing substrate upon which one or more layers of light curable material can be applied, embossed and flood cured to form retaining structures, which can then be filled with pigmented light curable material cured to produce icon structures. In certain embodiments, the light-curable material used to form arrangement of image icons 120 is a pigmented, ultraviolet (UV)-curable polymer.

In certain embodiments according to this disclosure, micro-optic system 100 comprises a seal layer 140. According to certain embodiments, seal layer 140 comprises a thin layer (for example, a 2 μm to 50 μm thick layer) of substantially clear material which interfaces on a lower surface, with focusing elements of the planar array of focusing elements 105, and comprises an upper surface with less variation in curvature (for example, by being smooth or by having a surface whose local undulations are of a larger radius of curvature than the focusing elements) than the planar array of focusing elements 105.

As shown in the non-limiting example of FIG. 1, in certain embodiments, micro-optic system 100 can be attached, for example, by an adhesive layer 130, to a substrate 150 to form a security document 160. According to various embodiments, substrate 150 can be a sheet of currency paper, or a polymeric substrate. According to some embodiments, substrate 150 is a thin, flexible sheet of a polymeric film, such as biaxially oriented polypropylene (BOPP). In various embodiments, substrate 150 is a section of a synthetic paper material, such as TESLIN®. According to some embodiments, substrate 150 is a section of a polymeric card material, such as a polyethylene terephthalate (PET) blank, of a type suitable for making credit cards and driver's licenses.

Figure 2:
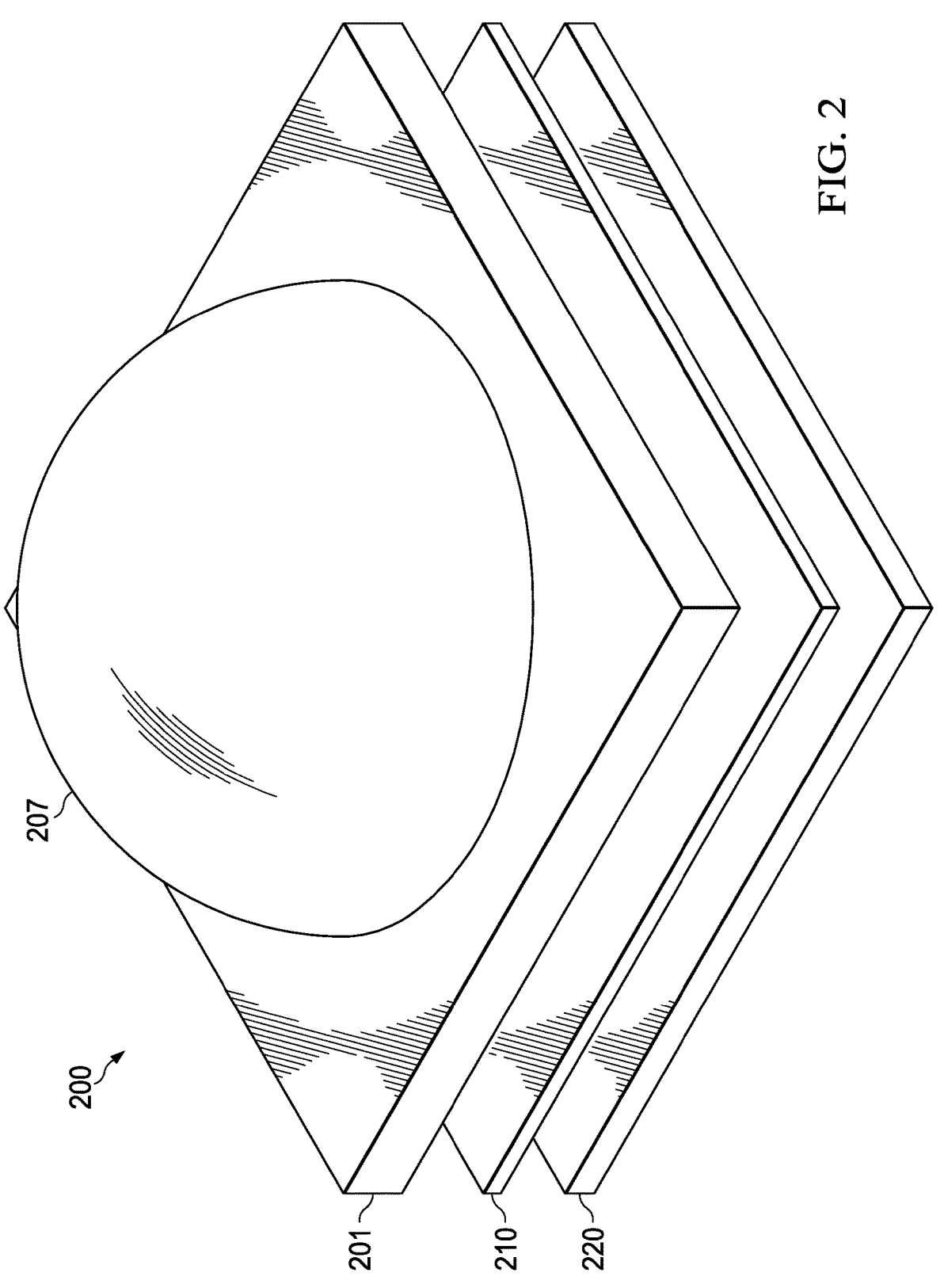
FIG. 2 illustrates exploded perspective views of a micro-optic cell within a micro-optic security device according to certain embodiments of this disclosure.

FIG. 2 illustrates, in exploded perspective views from above and below, a micro-optic cell 200 within a micro-optic security device (for example, micro-optic system 100 in FIG. 1) according to certain embodiments of this disclosure.

As used in this disclosure, the term "micro-optic cell" encompasses a three-dimensional section of a micro-optic security device corresponding to a single focusing element within a planar array of focusing elements (for example, planar array of focusing elements 105 in FIG. 1).

Referring to the non-limiting example of FIG. 2, micro-optic cell 200 is one of a plurality (in some embodiments, millions) of micro-optic cells forming a micro-optic security device (for example, micro-optic system 100 in FIG. 1). According to various embodiments, micro-optic cell 200 comprises a focusing element 207. In this illustrative example, focusing element 207 is a refractive focusing element (in this case, a plano-convex lens) which is formed by applying a layer of light curable material to an optical spacer layer 210 (for example, a layer of transparent film material also acting as a manufacturing substrate), embossing the layer to define the shape of focusing element 207, and in some embodiments, and depending on the F #of the focusing element, an additional optical spacer 201 (sometimes referred to as a "goo spacer") and then curing the materials with light (for example, UV light) to effect one or more chemical curing reactions to produce a layer of material of sufficient robustness for use in a micro-optic security device.

According to various embodiments, micro-optic cell 200 further comprises a section 220 of a structured image icon layer (for example, an image icon layer containing arrangement of image icons 120 in FIG. 1). Referring to the non-limiting example of FIG. 2, section 220 of the structured image icon layer comprises a plurality of retaining structures, wherein each retaining structure defines an isolated volume having a first depth. In various embodiments according to this disclosure, the image icon layer comprising section 220 is constructed using a similar manufacturing technique as focusing element 207, wherein a layer of uncured light curable material is applied to a side of optical spacer layer 210, embossed to form a plurality of retaining structures, and then exposed to a light source to activate a curing reaction in the material to produce a cured structured image icon layer.

As noted elsewhere in this disclosure, the dimensions by which the performance of a micro-optic security device can be measured include, without limitation, the extent to which the device and optical effects produced by the device are visually engaging. If a micro-optic security device reliably "catches a viewer's eye," then there is a greater chance that the absence of such a device, or irregularities in the appearance of the device will be noticed by users. Aesthetics beget engagement, and from an anti-counterfeiting standpoint, engagement can be highly advantageous.

Experience has shown that, sharpness and presence of multiple colors in a visual effect (for example, an emergent image, also referred to as a "synthetic image") presented by a micro-optic system can drive engagement. In many cases, a micro-optic security device is more likely to provide a sharp-looking visual effect when image icons are of a suitable thickness and are disposed within the focal plane of focusing elements of a planar array of focusing elements. According to some embodiments, suitable image icon thicknesses encompass a range of thicknesses between 0.5 μm to 3.5 μm. In some embodiments, suitable image icon thicknesses encompass a narrower range of thicknesses, such as, for example, 0.5 to 2.5 μm, or 1.5.-1.8 μm. For some applications, suitable image icons have thicknesses greater than 3.5 μm or less than 0.5 μm. "Thin" icons or out-of-focus icons can lead to, without limitation, the color(s) of the emergent image appearing washed out, and the details of the image appearing fuzzy.

Advantageously, certain embodiments according to this disclosure comprise hybrid image icons, wherein a hybrid image icon disposed within the focal footprint of a focusing element has two or more independently phased components. In this way, certain embodiments according to the present disclosure achieve satisfactory sharpness and color (because each component of the hybrid image icon is of sufficient depth to coincide with, or at least be proximate to, the focal point of focusing element 207). At the same time, by subdividing each image icon into multiple components occupying separate phase spaces, emergent images with compound (i.e., more than one at once) dynamic visual effects can be achieved.

As one non-limiting example of how certain embodiments according to this disclosure can expand the range of dynamic visual effects which can be provided by a micro-optic system projecting one or more emergent images of portions of an icon layer, certain embodiments according to the present disclosure can present a "multiple rolling band" effect, wherein bands of multiple colors are projected by either a lenticular or multi-directional array of focusing elements to appear to continuously roll through a space. Further, in some embodiments according to this disclosure, the rate at which the respective bands and perceived height of the bands relative to the plane of the optical security device can be modulated. Historically, with a unitary icon structure, such rolling band effects were limited to bands of a single color appearing to shimmer or roll within the space.

Figure 3C:
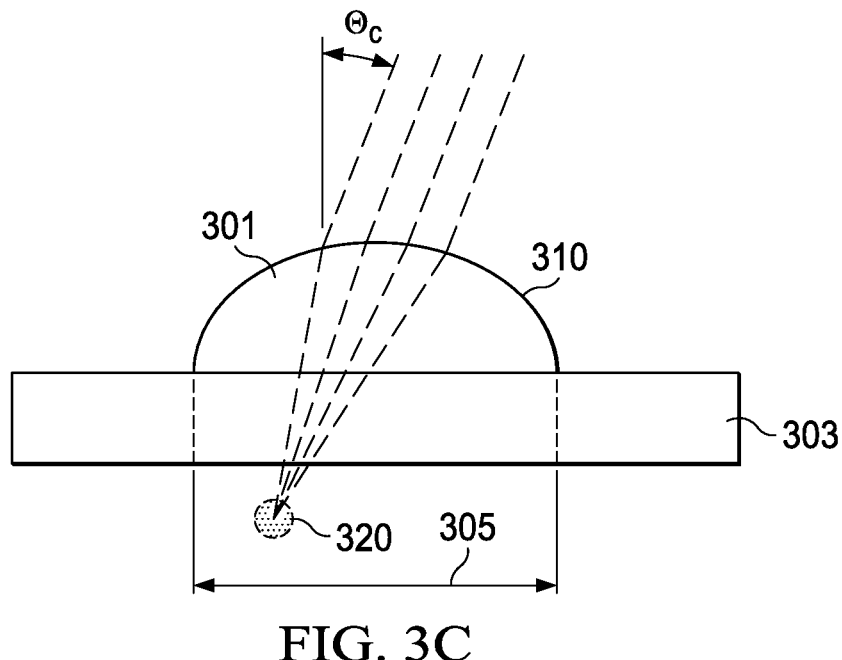

FIGS. 3A-3C (collectively, "FIG. 3") illustrate an example of how a focusing element focuses light within a focal footprint, according to various embodiments of this disclosure. For convenience of cross-reference, items common to more than one of FIGS. 3A through 3C are numbered similarly.

Referring to the non-limiting example of FIG. 3, a side view (FIG. 3C), an underside view (FIG. 3A) and an angled view (FIG. 3B) of a refractive focusing element 301, which is positioned on a portion of an optical spacer 303. According to certain embodiments, focusing element 301 is affixed to optical spacer 303 and has a fixed relationship to the surfaces of optical spacer 303. In certain embodiments, the fixed relationship between focusing element 301 and the surfaces of optical spacer 303 is achieved by applying a layer of light-curable material to optical spacer 303, embossing the layer of light-curable material to form a lensing surface and curing the material in situ. In some embodiments, the fixed relationship between focusing element 301 and the surfaces of optical spacer 303 is achieved by forming both focusing element 301 and optical spacer from a common layer of light-curable material and curing the formed layer to create an integrated focusing element-optical spacer combination.

Focusing element 301 is associated with a focal footprint 305, which according to some embodiments, is coextensive with the perimeter of focusing element 301. According to some embodiments, focal footprint 305 is smaller than the perimeter of focusing element 301. In certain embodiments, focal footprint 305 describes an area which is larger than the perimeter of focusing element 301.

As shown in the illustrative example of FIG. 3, light hits the lensing surface of focusing element 301 at an angle (or a range of angles) associated with a viewing angle, which is shown in the figure as Qc. The lensing action of focusing element 301 focuses the incident light in a region 320 within focal footprint 305.

Figure 4:
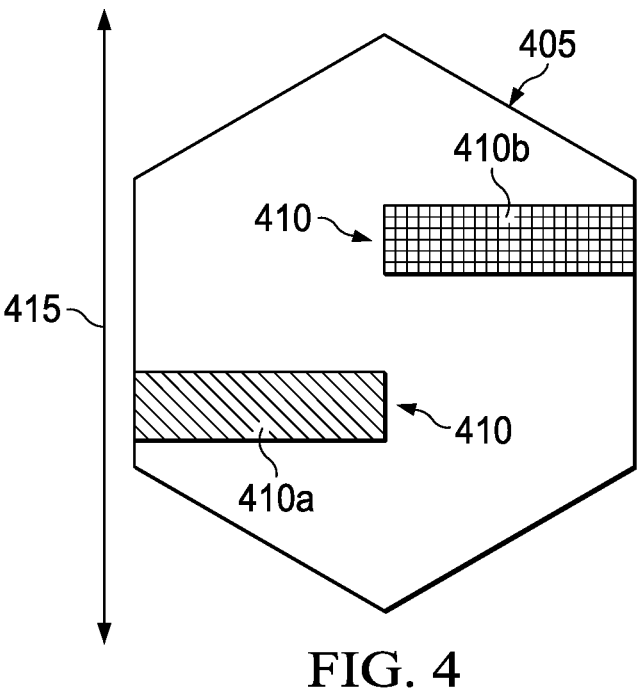
FIG. 4 illustrates an example of a hybrid image icon relative to a focal footprint according to certain embodiments of this disclosure.

FIG. 4 illustrates an example of a hybrid image icon 410 having a first component 410a and a second component 410b relative to a focal footprint 405 of a focusing element. According to various embodiments, focal footprint 405 is the focal footprint of a circular focusing element. In some embodiments, focal footprint 405 is a subdivision of the focal footprint of a lenticular lens.

In this explanatory example, hybrid image icon 410 is part of a micro-optic security device (for example, optical security device 100 in FIG. 1) comprising larger array of image icons (for example, arrangement of image icons 120 in FIG. 1). Similarly, the focusing element producing focal footprint 405 is part of a larger array of focusing elements (for example, planar array of focusing elements 105 in FIG. 1) of the micro-optic security. Further, hybrid image icon 410 is part of an icon layer which repeats along at least a first axis of repetition 415. Similarly, the focusing elements of the micro-optic security device repeat regularly according to the focusing elements' pitch along first axis of repetition 415.

According to various embodiments, when the hybrid image icons (for example, hybrid image icon 410), of the micro-optic security device are viewed through, (or, in the case of reflective focusing elements, reflected by) the focusing elements, the combined interaction of each focusing element's focusing and projecting light from a portion of its footprint produces a synthetic image, such as described in U.S. Pat. No. 7,738,175 to Steenblik, et al., which is incorporated herein by reference.

In certain embodiments, hybrid image icon 410 is subdivided into two or more constituent components, wherein each component occupies a separate phase space within an image icon layer. Micro-optic systems according to certain embodiments of this disclosure project emergent images due to the fact that the icon structures repeat with a similar periodicity and along similar axis/axes of repetition as the focusing elements of an arrangement of focusing elements. Further, the appearance and dynamic behavior (for example, how the emergent image changes in response to changes in a user's viewing angle) of the emergent image can be modulated by, without limitation, changing the relative periodicity (i.e., changing the phase) of the structures in the icon layer relative to the pitch of the focusing elements. For example, a slight skew between the axis of repetition of the focusing elements and the axis of repetition of the icon structures can produce orthoparallactic movement of the emergent image, wherein changes in viewpoint along a first axis result in changes of the emergent image along a second axis orthogonal to the first axis. Other design variables of the icon structure which can be modulated change appearance of the visual effects produced by the system include, without limitation, changing the area of the icon structures (which can vary the darkness of the emergent image(s)).

Referring to the non-limiting example of FIG. 4, first component 410a and 410b of hybrid image icon 410 occupy different phase spaces. As used in this disclosure, the expression "phase space" encompasses the phasing of the repetition of a component of a hybrid image icon relative to the repetition period (i.e., the pitch) of the focusing elements and the phasing and offset of the repetition of the component of the hybrid image icon relative to the other components of the hybrid image icon. Thus, phase space can be a function of a ratio between a given component of the hybrid image icons and the pitch of the focusing elements along a given axis of repetition and the offset between the given components and other components of the hybrid image icon.

Figure 5:
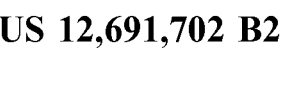
FIG. 5 illustrates an example of an icon layer comprising hybrid image icons relative according to various embodiments of this disclosure to the footprints of focusing elements of an array of focusing elements.

FIG. 5 illustrates an example of an icon layer comprising hybrid image icons relative according to various embodiments of this disclosure to the focal footprints of focusing elements of an array of focusing elements.

Referring to the non-limiting example of FIG. 5, focal footprints (including focal footprints 501*a* and 501*b*) of focusing elements of a section of an array of focusing elements (for example, planar array of focusing elements 105 in FIG. 1) are shown in the figure. Further, the positions of hybrid image icons (for example, hybrid image icon 410 in FIG. 4) of a larger array of image icons (for example, an arrangement of image icons 120 in FIG. 1) relative to each focusing element's footprints are shown in the figure. Further, the focal point (for example, focal point 505) of each focusing element relative to its focal footprint is shown in the figure. In the explanatory example of FIG. 5, the size of the focal points relative to the focal footprint has been exaggerated to facilitate explanation. In certain embodiments according to this disclosure, focusing elements can produce focal points on the order of 1um in diameter.

As noted elsewhere in this disclosure, phasing differences in the repetition of focusing elements (and by implication, their focal points within a shared focal plane) and the repetition of icon structures along one or more axes of repetition (for example, first axis of repetition 510) can, over micro-optic arrays comprising thousands, or more typically, multiple millions of cells, result in emergent images of the content of the image icon layer being projected by the system.

Referring again to the illustrative example of FIG. 5, by utilizing hybrid image icons (for example, hybrid image icon 515), wherein each image icon comprises two or more components, certain embodiments according to the present disclosure project an emergent image comprising two or more dynamic components. In this illustrative example, the hybrid image icons comprise first and second components, wherein, for a given viewing angle, first components, second components or both first and second components may fall within the focal point of a focusing element (for example, focal point 505). In this way, certain embodiments according to this disclosure can project multiple emergent images (i.e., an emergent image associated with each component of the hybrid image icon) over the same angular space (i.e., range of viewing angles) while a micro-optic device is being tilted. As one, non-limiting example of how projecting multiple emergent images within the same space according to some embodiments of this disclosure can expand the range of effects provided by micro-optic security devices, devices according to the present disclosure, even those utilizing lenticular focusing elements, can project multiple "rolling bars" or "shimmer" effects at once. Such concatenated "shimmer" effects are not believed to be previously known in the art.

Figure 6:
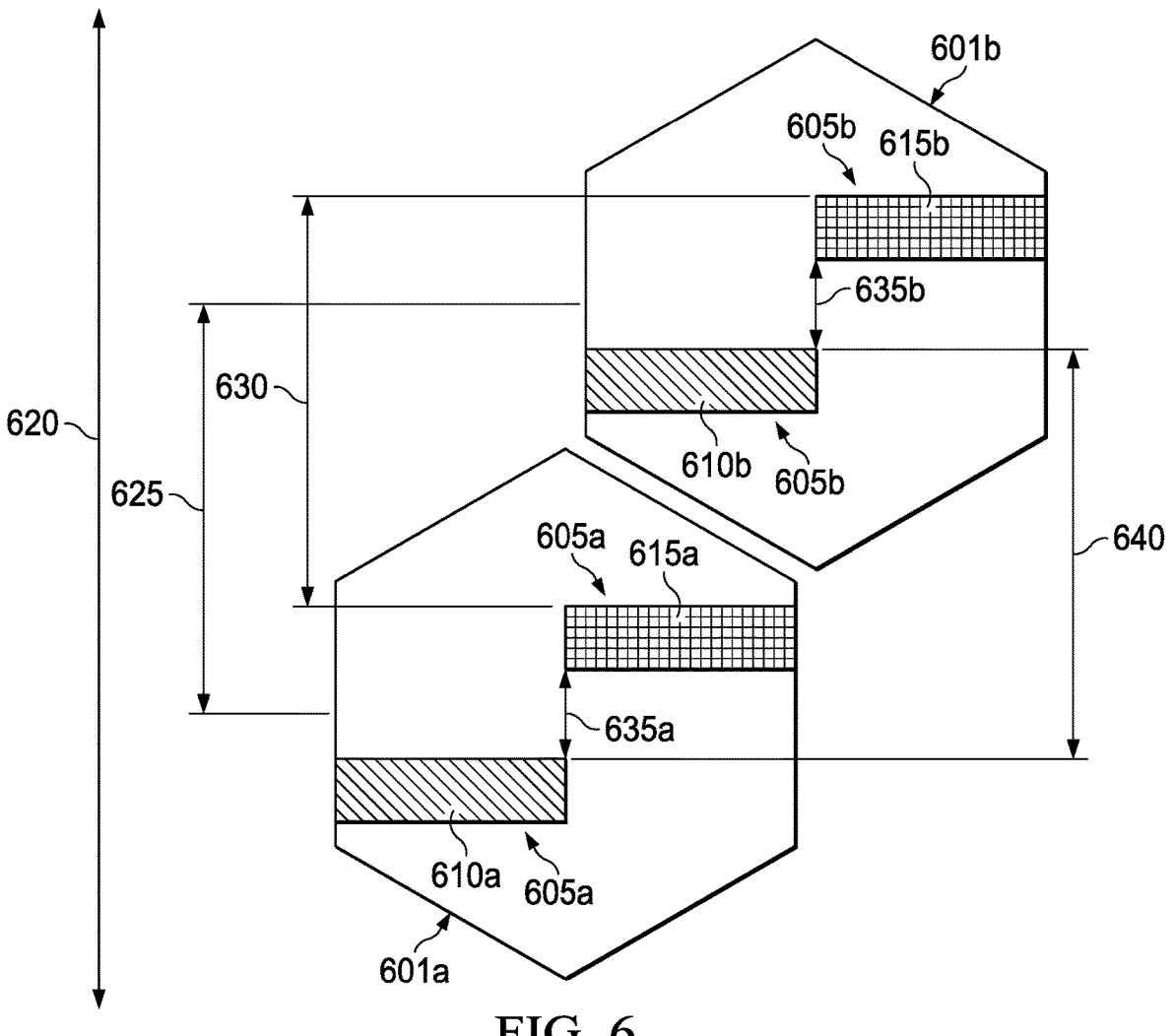
FIG. 6 illustrates an example of phase spaces between components of a hybrid image icon according to various embodiments of this disclosure.

FIG. 6 illustrates an example of phase spaces between components of a hybrid image icon according to various embodiments of this disclosure.

Referring to the illustrative example of FIG. 6, a first focal footprint 601*a* and a second focal footprint 601*b* are shown in the figure. Further, first focal footprint 601*a* covers an area within an array of image icons (for example, arrangement of image icons 120 in FIG. 1) comprising first hybrid image icon 605*a*, and second focal footprint 601*b* covers an area within the array of image icons comprising second hybrid image icon 605*b*. In this illustrative example, hybrid image icon 605*a* comprises a first component 610*a*. According to various embodiments, first component 610*a* comprises a region of material (for example, UV-curable polymer of a first color filling a recess in a retaining structure) in the icon layer. In some embodiments, first component 610*a* is a part of a surface-mounted image icon. As used in this disclosure, the expression "surface mounted image icon" encompasses a section of material in an icon layer which contributes to the formation of an emergent image, and whose position is not predefined by the location of a retaining structure. In some embodiments, surface mounted image icons can be formed by directly curing a layer of uncured icon material by directing a curing light through the focusing elements, thereby focusing the curing light on a selected subset of certain image icons focal footprints. According to some embodiments, first hybrid image icon 605*a* further comprises a second component 615*a*, which, in some embodiments, is of similar construction to first component 610*a*, only differing in that it is formed of a material of a color which contrasts to the first color used for first component 610*a*. Similarly, second hybrid image icon 605*b* comprises a first component 610*b*, which is of similar construction to first component 610*a*, and a second component 615*b*, which is likewise of similar construction to second component 615*a*.

According to various embodiments, first focal footprint 601*a* and second focal footprint 601*b* are two footprints of a much larger (for example, millions or billions) of focal footprints of a micro-optic system (for example, micro-optic system 100 in FIG. 1) which can project, at a given viewing angle, a first emergent image of the first components of the hybrid image icons, and a second emergent image of the second components of the hybrid image icons. As discussed elsewhere in this disclosure, the projection of emergent images is, without limitation, a function of how the components of the image icon layer repeat along one or more axes of repetition (for example, first axis of repetition 620) relative to how the focusing elements repeat along the same axis of repetition. The parameters describing the repetition of a first set of icon structures relative to the focusing elements and other icon structures define the phase space of the icon structure.

Referring to the illustrative example of FIG. 6, the first components (i.e., first components 610*a* and 610*b*) of hybrid image icons 605*a* and 605*b* occupy a first phase space. Similarly, the second components (i.e., second components 615*a* and 615*b*) of hybrid image icons 605*a* and 6015*b* occupy a second phase space. By subdividing the image icons into components occupying separate phase spaces, certain embodiments according to this disclosure are able to produce previously unseen emergent image effects based upon the choreographed projection of two or more emergent images as the micro-optic device tilts within a single angular viewing space.

As shown in the explanatory example of FIG. 6, the focusing elements associated with first focal footprint 601*a* and second focal footprint 601*b* repeat along first axis of repetition 620 over a first interval 625. According to certain embodiments, the lens pitch is the quotient of first interval 625 relative to a common unit of measurement. Pitch can be expressed as, for example, lenses per inch. Further, first components 610*a* and 610*b* of the hybrid image icons repeat over a first component interval 630. The ratio of first interval 625 to first component interval 630 along first axis of repetition 620 defines a first repeat ratio. Depending on the magnitude of first component interval 630 relative to first interval 625, the emergent image of the first components will appear either above or below the plane of the micro-optic security device. Additionally, first components 610a and 610b are separated from second components 615a and 615b by offsets 635a and 635b. Depending on embodiments, the relative values of offsets 635a and 635b may be constant. Alternatively, where the second component interval 640 over which the second components of the image icons repeat along first axis of repetition 620 differs from first component interval 630, the magnitude of offsets 635a and 635b may vary across the micro-optic device. According to certain embodiments, the repeat ratio between first component interval 630 and first interval 625, along with the properties of offsets 635a and 635b define a first phase space for the first components of hybrid image icons 605a and 605b. It should be noted that, in certain embodiments, the phase space for components of image icons can vary over an arrangement of image icons, with first components having a given phase space at one location in the arrangement, and a different phase space elsewhere. In this way, emergent images projected by the first components of the hybrid image icons of micro-optic system can appear three dimensional.

Similarly, the repeat ratio between second component interval 640 and first interval 625, in combination with the magnitude and change in the offsets 635a and 635b defines a second phase space for the second component of hybrid image icons 605a and 605b. As with the first phase space, the second phase space can likewise vary locally within the image icon layer of the micro-optic device of which hybrid image icons 605a and 605b are a part.

Figure 7:
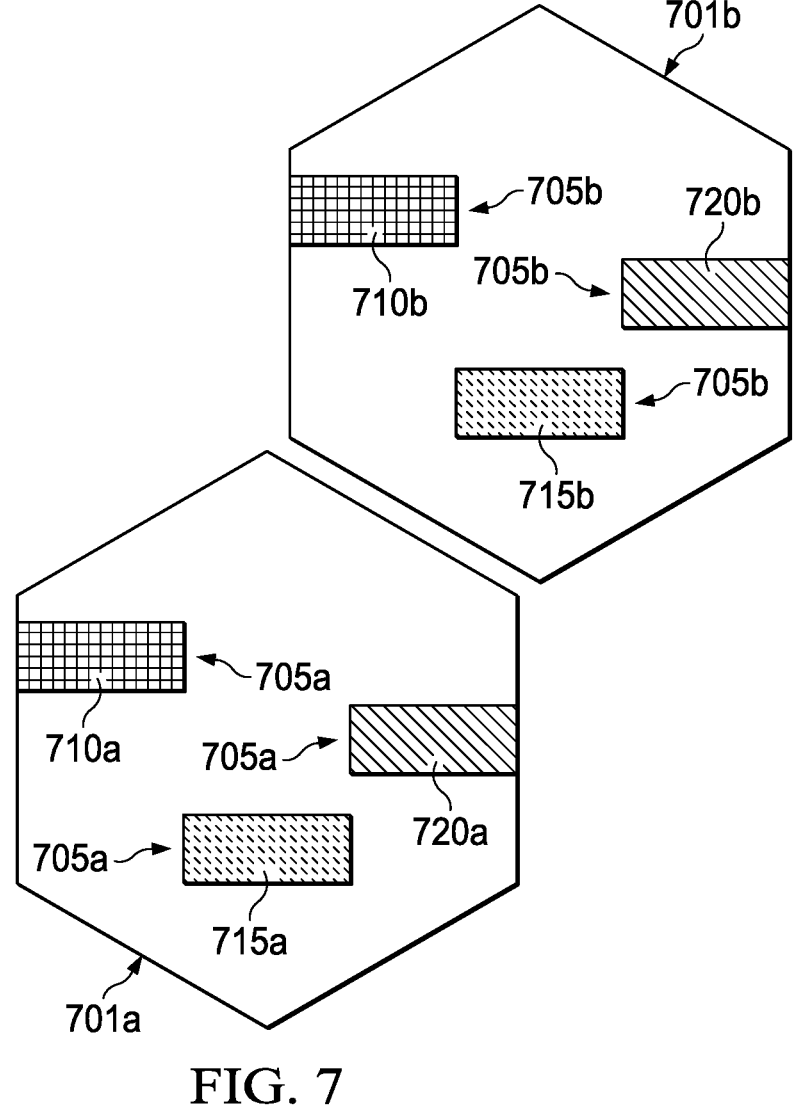
FIG. 7 illustrates an example of a focal footprint and a hybrid image icon comprising three components according to various embodiments of this disclosure.

FIG. 7 illustrates an example of a focal footprint and a hybrid image icon comprising three components, according to various embodiments of this disclosure. While the preceding figures have described examples of micro-optic systems with a multi-phase icon structure with reference to hybrid image icons with two components, embodiments according to this disclosure are not so limited, and embodiments with hybrid image icons having three or more components are within the contemplated scope of this disclosure.

Referring to the non-limiting example of FIG. 7, a first focal footprint 701a and second focal footprint 701b are shown in the figure. Further, first hybrid image icon 705a is positioned within first focal footprint 701a, and second hybrid image icon 705b is positioned within second focal footprint 701b.

As shown in FIG. 7, each of first hybrid image icon 705a and 705b have first components 710a and 710b, comprising regions of colored icon material occupying a first phase space and projecting a first emergent image at a given angular space. Hybrid image icons 705a and 705b further comprise second components 715a and 715b, which likewise comprise regions of colored icon material of a color contrasting with first components 710a and 710b, which occupy a second phase space and project a second emergent image at the given angular space. Additionally, hybrid image icons 7015a and 7015b comprise third components 720a and 720b, which comprise material of a color which contrasts with both first components 710a and 710b, and also second components 715a and 715b. Further, third components 720a and 720b occupy a third phase space and project a third emergent image at the given angular space.

Examples of optical security devices according to some embodiments of this disclosure include optical security devices comprising an array of focusing elements spaced at a first pitch along a first axis of repetition, wherein each focusing element of the array of focusing elements is associated with a focal footprint at a first focal depth; and an icon layer disposed at the first focal depth relative to the array of focusing elements, the icon layer comprising an array of hybrid image icons. Wherein each hybrid image icon comprises a first component associated with a first emergent image projected by the optical security device and a second component associated with a second emergent image projected by the optical security device. Wherein the first components of the hybrid image icons repeat along the first axis of repetition such that the first components of the hybrid image icons occupy a first phase space within focal footprints of focusing elements of the array of focusing elements. Wherein the second components of the hybrid image icons along the first axis of repetition such that the second components of the hybrid image icons occupy a second phase space within focal footprints of focusing elements of the array of focusing elements.

Examples of optical security devices according to some embodiments of this disclosure include optical security devices wherein focusing elements of the array of focusing elements comprise hexagonal or aspherical focusing elements.

Examples of optical security devices according to some embodiments of this disclosure include optical security devices wherein focusing elements of the array of focusing elements comprise spherical focusing elements.

Examples of optical security devices according to some embodiments of this disclosure include optical security devices wherein the first components of the hybrid image icons repeat along the first axis of repetition at a first repeat ratio relative to the first pitch, the second components of the hybrid image icons repeat along the first axis of repetition at a second repeat ratio relative to the first pitch, and wherein the first repeat ratio is equal to the second repeat ratio.

Examples of optical security devices according to some embodiments of this disclosure include optical security devices wherein the first components of the hybrid image icons repeat along the first axis of repetition at a first repeat ratio relative to the first pitch, the second components of the hybrid image icons repeat along the first axis of repetition at a second repeat ratio relative to the first pitch, and wherein the first repeat ratio is not equal to the second repeat ratio.

Examples of optical security devices according to some embodiments of this disclosure include optical security devices wherein at least one of the first emergent image or the second emergent image is a dynamic emergent image.

Examples of optical security devices according to some embodiments of this disclosure include optical security devices wherein the first components of the hybrid image icons are of a first color, and the second components of a second color, wherein the second color contrasts with the first color.

Examples of optical security devices according to some embodiments of this disclosure include optical security devices wherein the first emergent image comprises at least one cyclically repeating band of the first color moving through a first area of the optical security device in response to a change in viewing angle, and the second emergent image comprises at least one cyclically repeating band of the second color moving through the first area of the optical security device in response to the change in viewing angle.

Examples of optical security devices according to some embodiments of this disclosure include optical security devices wherein focusing elements of the array of focusing elements comprise lenticular focusing elements.

Examples of optical security devices according to some embodiments of this disclosure include optical security devices wherein each hybrid image icon further comprises a third component associated with a third emergent image projected by the optical security device, wherein the third components of the hybrid image icons repeat along the first axis of repetition such that the third components of the hybrid image icons occupy a third phase space within focal footprints of focusing elements of the array of focusing elements.

Examples of optical security devices according to some embodiments of this disclosure include optical security devices wherein the first phase space is a function of a first repeat ratio between first components of the hybrid image icons and the first pitch of the focusing elements along the first axis of repetition and an offset between the first components and other components of the hybrid image icons.

Examples of methods of making an optical security device according to various embodiments of this disclosure include methods comprising providing an array of focusing elements spaced at a first pitch along a first axis of repetition, wherein each focusing element of the array of focusing elements is associated with a focal footprint at a first focal depth; and providing an icon layer disposed at the first focal depth relative to the array of focusing elements, the icon layer comprising an array of hybrid image icons. Wherein each hybrid image icon comprises a first component associated with a first emergent image projected by the optical security device and a second component associated with a second emergent image projected by the optical security device. Wherein the first components of the hybrid image icons repeat along the first axis of repetition such that the first components of the hybrid image icons occupy a first phase space within focal footprints of focusing elements of the array of focusing elements. Wherein the second components of the hybrid image icons along the first axis of repetition such that the second components of the hybrid image icons occupy a second phase space within focal footprints of focusing elements of the array of focusing elements.

Examples of methods of making an optical security device according to various embodiments of this disclosure include methods wherein the first phase space is a function of a first repeat ratio between first components of the hybrid image icons and the first pitch of the focusing elements along the first axis of repetition and an offset between the first components and other components of the hybrid image icons.

Examples of methods of making an optical security device according to various embodiments of this disclosure include methods wherein focusing elements of the array of focusing elements comprise hexagonal or aspherical focusing elements.

Examples of methods of making an optical security device according to various embodiments of this disclosure include methods wherein focusing elements of the array of focusing elements comprise spherical focusing elements.

Examples of methods of making an optical security device according to various embodiments of this disclosure include methods wherein the first components of the hybrid image icons repeat along the first axis of repetition at a first repeat ratio relative to the first pitch, the second components of the hybrid image icons repeat along the first axis of repetition at a second repeat ratio relative to the first pitch, and wherein the first repeat ratio is equal to the second repeat ratio.

Examples of methods of making an optical security device according to various embodiments of this disclosure include methods wherein the first components of the hybrid image icons repeat along the first axis of repetition at a first repeat ratio relative to the first pitch, the second components of the hybrid image icons repeat along the first axis of repetition at a second repeat ratio relative to the first pitch, and wherein the first repeat ratio is not equal to the second repeat ratio.

Examples of methods of making an optical security device according to various embodiments of this disclosure include methods wherein the first components of the hybrid image icons are of a first color, and the second components of a second color, wherein the second color contrasts with the first color.

Examples of methods of making an optical security device according to various embodiments of this disclosure include methods wherein the first emergent image comprises at least one cyclically repeating band of the first color moving through a first area of the optical security device in response to a change in viewing angle, and the second emergent image comprises at least one cyclically repeating band of the second color moving through the first area of the optical security device in response to the change in viewing angle.

Examples of methods of making an optical security device according to various embodiments of this disclosure include methods wherein focusing elements of the array of focusing elements comprise lenticular focusing elements.

None of the description in this application should be read as implying that any particular element, step, or function is an essential element that must be included in the claim scope. The scope of patented subject matter is defined only by the claims. Moreover, none of the claims is intended to invoke 35 U.S.C. § 112 (f) unless the exact words "means for" are followed by a participle.

What is claimed is:

1. An optical security device comprising:

an array of focusing elements spaced at a first pitch along a first axis of repetition, wherein each focusing element of the array of focusing elements is associated with a focal footprint at a first focal depth; and an icon layer disposed at the first focal depth relative to the array of focusing elements, the icon layer comprising an array of hybrid image icons, wherein each hybrid image icon comprises a first component associated with a first emergent image projected by the optical security device and a second component associated with a second emergent image projected by the optical security device, wherein the first components of the hybrid image icons repeat along the first axis of repetition such that the first components of the hybrid image icons occupy a first phase space within focal footprints of focusing elements of the array of focusing elements, and wherein the second components of the hybrid image icons repeat along the first axis of repetition such that the second components of the hybrid image icons occupy a second phase space within focal footprints of focusing elements of the array of focusing elements, wherein the first phase space is a function of a first repeat ratio between the first components of the hybrid image icons and the first pitch of the focusing elements along the first axis of repetition and an offset between the first components and other components of the hybrid image icons.

2. The optical security device of claim 1, wherein focusing elements of the array of focusing elements comprise hexagonal or aspherical focusing elements.

3. The optical security device of claim 1, wherein focusing elements of the array of focusing elements comprise spherical focusing elements.

4. The optical security device of claim 1, wherein:

the first components of the hybrid image icons repeat along the first axis of repetition at the first repeat ratio relative to the first pitch, the second components of the hybrid image icons repeat along the first axis of repetition at a second repeat ratio relative to the first pitch, and the first repeat ratio is equal to the second repeat ratio.

5. The optical security device of claim 1, wherein:

the first components of the hybrid image icons repeat along the first axis of repetition at the first repeat ratio relative to the first pitch, and the second components of the hybrid image icons repeat along the first axis of repetition at a second repeat ratio relative to the first pitch, wherein the first repeat ratio is not equal to the second repeat ratio.

6. The optical security device of claim 1, wherein at least one of the first emergent image or the second emergent image is a dynamic emergent image.

7. The optical security device of claim 1, wherein:

the first components of the hybrid image icons are of a first color, and the second components of the hybrid image icons are of a second color, wherein the second color contrasts with the first color.

8. The optical security device of claim 7, wherein:

the first emergent image comprises at least one cyclically repeating band of the first color moving through a first area of the optical security device in response to a change in viewing angle, and the second emergent image comprises at least one cyclically repeating band of the second color moving through the first area of the optical security device in response to the change in viewing angle.

9. The optical security device of claim 1, wherein focusing elements of the array of focusing elements comprise lenticular focusing elements.

10. The optical security device of claim 1, wherein each hybrid image icon further comprises a third component associated with a third emergent image projected by the optical security device, wherein the third components of the hybrid image icons repeat along the first axis of repetition such that the third components of the hybrid image icons occupy a third phase space within focal footprints of focusing elements of the array of focusing elements.

11. A method of making an optical security device, the method comprising:

providing an array of focusing elements spaced at a first pitch along a first axis of repetition, wherein each focusing element of the array of focusing elements is associated with a focal footprint at a first focal depth; and providing an icon layer disposed at the first focal depth relative to the array of focusing elements, the icon layer comprising an array of hybrid image icons, wherein each hybrid image icon comprises a first component associated with a first emergent image projected by the optical security device and a second component associated with a second emergent image projected by the optical security device, wherein the first components of the hybrid image icons repeat along the first axis of repetition such that the first components of the hybrid image icons occupy a first phase space within focal footprints of focusing elements of the array of focusing elements, and wherein the second components of the hybrid image icons repeat along the first axis of repetition such that the second components of the hybrid image icons occupy a second phase space within focal footprints of focusing elements of the array of focusing elements, wherein the first phase space is a function of a first repeat ratio between the first components of the hybrid image icons and the first pitch of the focusing elements along the first axis of repetition and an offset between the first components and other components of the hybrid image icons.

12. The method of claim 11, wherein focusing elements of the array of focusing elements comprise hexagonal or aspherical focusing elements.

13. The method of claim 11, wherein focusing elements of the array of focusing elements comprise spherical focusing elements.

14. The method of claim 11, wherein:

the first components of the hybrid image icons repeat along the first axis of repetition at the first repeat ratio relative to the first pitch, and the second components of the hybrid image icons repeat along the first axis of repetition at a second repeat ratio relative to the first pitch, wherein the first repeat ratio is equal to the second repeat ratio.

15. The method of claim 11, wherein:

the first components of the hybrid image icons repeat along the first axis of repetition at the first repeat ratio relative to the first pitch, and the second components of the hybrid image icons repeat along the first axis of repetition at a second repeat ratio relative to the first pitch, wherein the first repeat ratio is not equal to the second repeat ratio.

16. The method of claim 11, wherein:

the first components of the hybrid image icons are of a first color, and the second components of the hybrid image icons are of a second color, wherein the second color contrasts with the first color.

17. The method of claim 11, wherein:

the first emergent image comprises at least one cyclically repeating band of a first color moving through a first area of the optical security device in response to a change in viewing angle, and the second emergent image comprises at least one cyclically repeating band of a second color moving through the first area of the optical security device in response to the change in viewing angle.

18. The method of claim 11, wherein focusing elements of the array of focusing elements comprise lenticular focusing elements.

* * * * *